April 28, 1959

J. T. WELBOURN 2,884,086

SOUND-ABSORBING HOUSING AND STRUCTURE

Filed April 24, 1956

INVENTOR
JOHN T. WELBOURN

BY Wade Koontz AND
Lloyd B. Stevens, Jr.
ATTORNEYS.

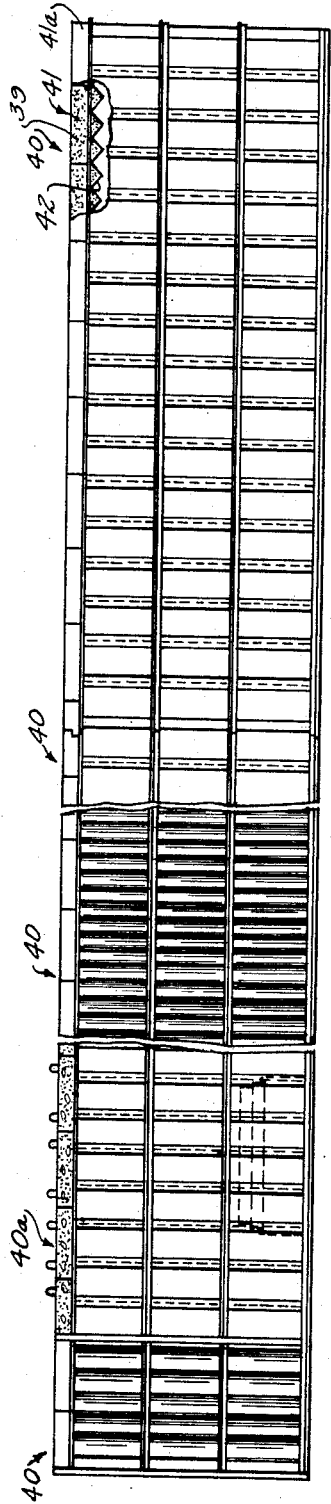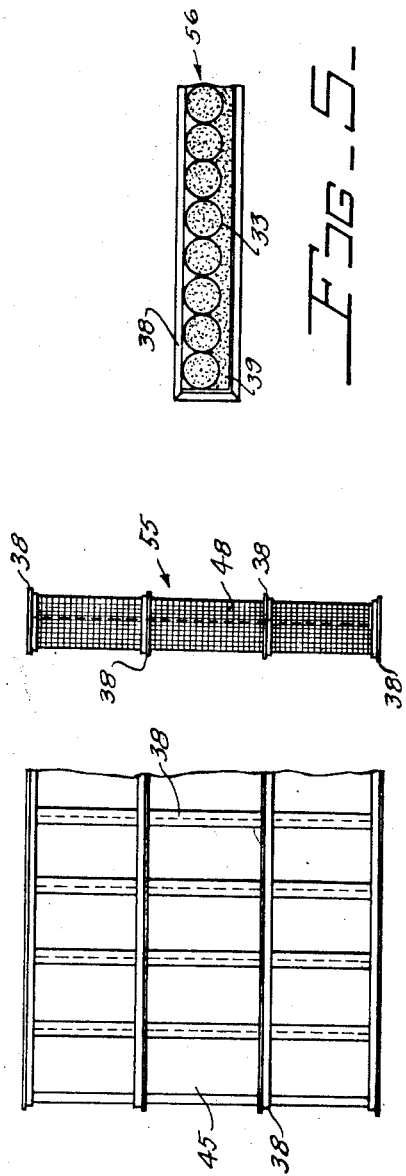

April 28, 1959 J. T. WELBOURN 2,884,086
SOUND-ABSORBING HOUSING AND STRUCTURE
Filed April 24, 1956
4 Sheets-Sheet 3
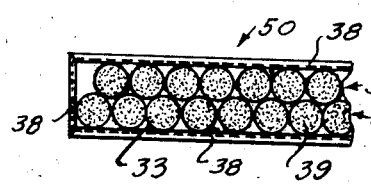
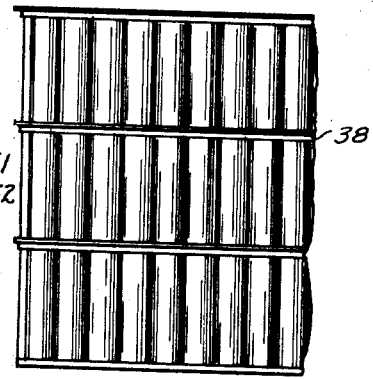
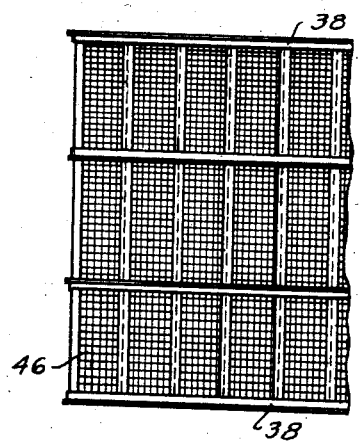
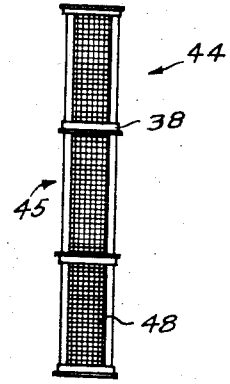
INVENTOR.
JOHN T. WELBOURN
BY
AND
ATTORNEYS April 28, 1959  J. T. WELBOURN  2,884,086
SOUND-ABSORBING HOUSING AND STRUCTURE
Filed April 24, 1956  4 Sheets-Sheet 4
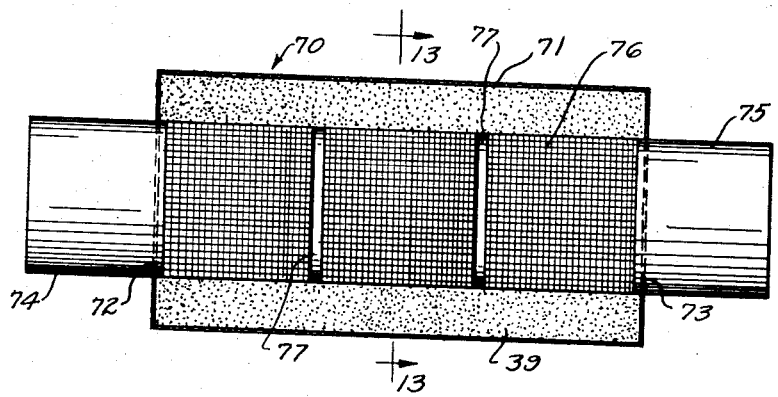
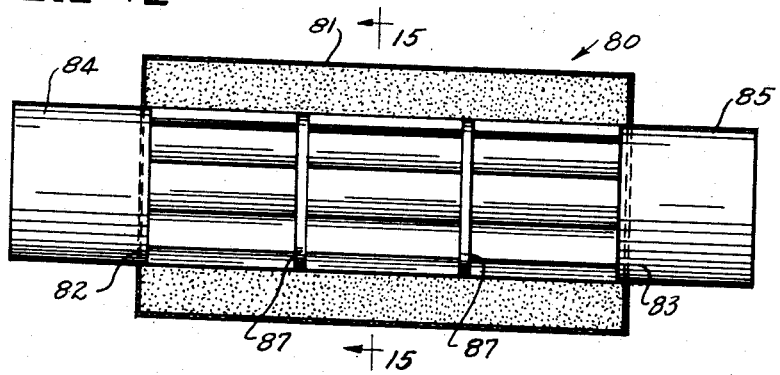
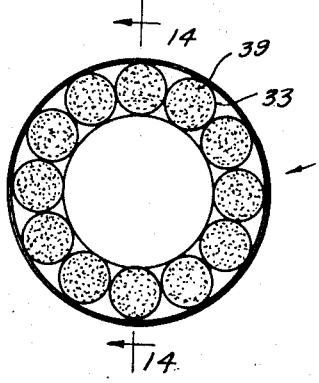
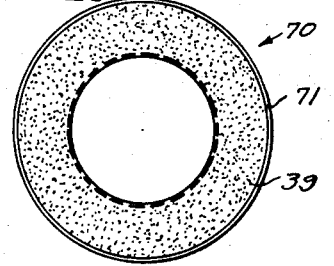
INVENTOR.
JOHN T. WELBOURN
BY
ATTORNEYS

United States Patent Office 2,884,086
Patented Apr. 28, 1959

2,884,086
SOUND-ABSORBING HOUSING AND STRUCTURE

John T. Welbourn, Pittsburgh, Pa.

Application April 24, 1956, Serial No. 580,412

6 Claims. (Cl. 181—50)

(Granted under Title 35, U.S. Code (1952), sec. 266)

The invention described herein may be manufactured and used by or for the United States Government for governmental purposes without payment to me of any royalty thereon.

This invention relates to a sound-absorbing housing for jet engine testing and to a structure usable as a sound-absorbing building material wherein loose granular material is used to absorb the sound. This invention also relates to sound-absorbing structures usable as exhaust mufflers for internal combustion engines or for jet engine testing wherein loose granular material is used to absorb the sound.

Previous porous sound absorbers have been in the form of tiles, plasters, and cast units, in which voids were formed by air or gas entrainment, or by the inclusion of aggregates containing voids. Other sound absorbers have been made of fibrous materials. These absorbers have, in general, a relatively soft structure which deteriorates in the presence of extremely loud sound fields, particularly in the low frequencies, and especially when subjected to elevated temperatures.

It is a principal object of this invention to provide a sound-absorbing housing for jet engine testing of new and improved design wherein the sound-absorbing material is loose granular material retained in a hollow perforated structural framework.

It is another object of this invention to provide a new and improved sound-absorbing structure usable as a building material wherein loose granular material is contained in a perforated hollow panel.

It is a further object of this invention to provide a new and improved silencer or muffler usable on internal combustion engines or for jet engine testing wherein loose granular material retained in annular space in a casing is the sound-absorbing material.

It is yet another object of this invention to provide a new and improved sound-absorbing structure using relatively inexpensive loose granular material in large volumes for high sound absorption which material is easily replaceable by adding fresh material as it erodes away during use.

It is still another object of this invention to provide a new and improved sound-absorbing structure of great flexibility in a design to suit most any sound-absorbing problem wherein loose granular material as the sound-absorbing agent is incorporated in any desired perforated retaining structure of any suitable shape.

It is an additional object of this invention to provide a new and improved sound-absorbing structure for use at moderately high temperatures wherein loose granular material for sound absorption is used and cement is not required to hold the mass together, rather a suitable perforated hollow framework or structure is used to retain the loose granular material.

It is still a further object of this invention to provide a new and improved sound-absorbing structure containing loose granular material providing mechanical flexibility to produce durability under conditions where vibration and sound field intensity are so high as to produce deterioration of other types of sound-absorbing materials.

It is yet a further object of this invention to provide a new and improved sound-absorbing structure containing loose granular material which structure and particle size are adjustable in dimensions to selectively absorb sound within a desired frequency range.

These and other objects of the invention will become apparent as the detailed description of the invention proceeds.

The structure of this invention is a fabric, framework, panel, casing, or the like, containing a multitude of holes through which sound can pass and containing loose granular material which forms a body with many small, irregular, many-branched openings. Sound vibrations projected through the openings in the retaining framework enter the tortuous passages between the granular particles and are absorbed by being converted into heat through viscous and fluid flow and vibration of the particles. Sound is also absorbed in the particles themselves if the particles are made of porous material such as slag. However, other materials besides slag are usable as the loose granular material for sound absorption such as expanded shale, expanded clay, crushed stone, or even sand depending on the severity of conditions of use such as temperature, sound intensity and frequency range, etc. Preferred particle sizes for the loose granular sound-absorbing material is from about ⅛ inch to about 1 inch diameter depending on the composition of the material and the particular conditions of use.

The invention will be more clearly understood from the following detailed description of specific embodiments thereof read in conjunction with the accompanying drawings wherein:

Fig. 2 is a side elevational view of the same housing as shown in Fig. 1 with the additional showing of the housing top;

Fig. 3 is a side elevational view of the structure used in the walls of the fourth section and the additional wall of the exhaust section of the housing of Fig. 1;

Fig. 4 is an end elevational view of the structure of Fig. 3;

Fig. 5 is a plan view of the structure of Fig. 3;

Fig. 6 is a side elevational view of the structure used in the walls of the third section of the housing of Fig. 1;

Fig. 7 is an end elevational view of the structure of Fig. 6;

Fig. 8 is a plan view of the structure of Fig. 6;

Fig. 9 is a side elevational view of the structure used in the walls of the second section of the housing of Fig. 1;

Fig. 10 is an end elevational view of the structure of Fig. 9;

Fig. 11 is a plan view of the structure of Fig. 9;

Fig. 12 is a longitudinal sectional view of a structure usable as a muffler;

Fig. 13 is a cross sectional view of the structure of Fig. 12;

Fig. 14 is a longitudinal sectional view of a different design than Fig. 12 of a structure usable as a muffler; and Fig. 15 is a cross sectional view of the structure of Fig. 14.

Figure 1:
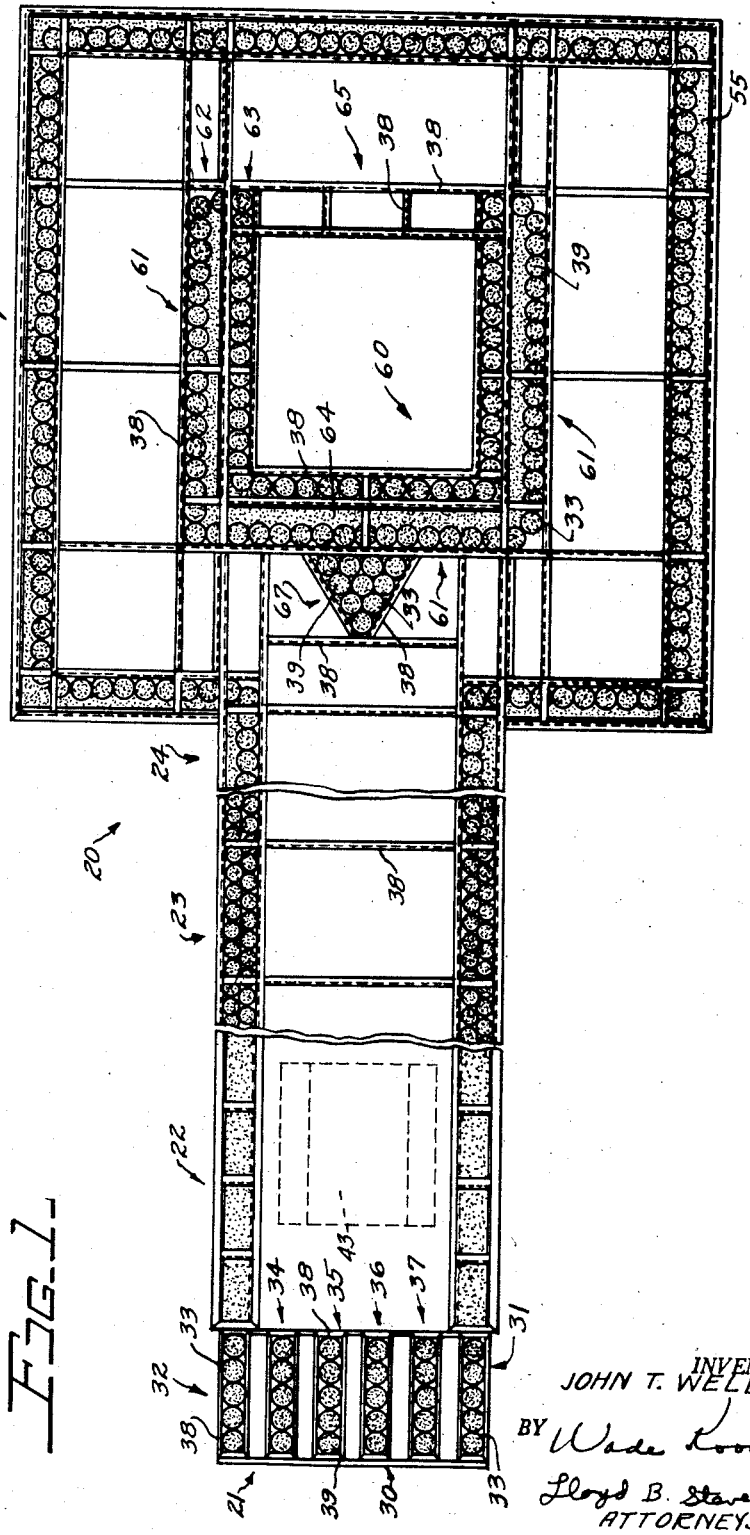
Fig. 1 is a plan view of a sound-absorbing housing for jet engine testing with the top of the housing removed.

A preferred embodiment of the sound absorbing housing for testing jet engines is shown in Figs. 1 and 2, and details of the construction of this housing are also shown in Figs. 3, 4, 5, 6, 7, 8, 9, 10 and 11. The discussion of the housing will be with reference to all these figures using the same reference numbers for identical parts in the various figures.

Housing 20 is composed of five main sections called inlet section 21, second section 22, third section 23, fourth section 24, and exhaust section 25.

The combustion air for the jet engine being tested enters inlet section 21 primarily through metal screen 30, which can suitably be made of steel. The size of the holes in the screen is not critical, since a major purpose of the screen is to filter out from the combustion air large pieces of material that might enter the jet engine and damage it. Suitably the metal screen is positioned vertically to the ground or base for the structure. The walls of the inlet section are rows 31 and 32 of upright perforated hollow metal cylinders 33. Four more rows 34, 35, 36 and 37 of cylinders 33 are arranged spaced from one another between and parallel to rows 31 and 32 and perpendicular to screen 30. These internal rows of cylinders are for the purpose of sound absorption within the inlet section. Additional combustion air over and above that entering via screen 30 can enter the inlet section through perforated cylinders 33 of rows 31 and 32, but this air must filter through loose granular expanded slag material 39 contained in cylinders 33. Suitable structural supports 38 hold the parts of the inlet section rigidly in place to form a unitary structure. Top 40 of the inlet section is of the same construction as the tops of all the other sections except section 22, and the outer side 41 of the top is a solid sheet of metal. Sides 41a of the top can also be solid metal plates; however, the under side 42 is suitably made of triangular trough-shaped construction with perforations therein, and the top is filled with loose granular sound-absorbing material 39.

Second section 22 of the housing surrounds test stand 43 on which is mounted the jet engine to be tested. Inlet section 21 communicates directly with the second section furnishing combustion air for the jet engine. Panels 44 form the walls of the second section. The outer sides of panels 44 are solid metal sheets 45, and the inner sides are perforated sheets 46. See Figs. 9, 10 and 11 for details of the panel or wall construction for the second section. Structural supports 38 strengthen and aid in holding together the panels or walls of section 22. End sheets 48 of panels 44 can be perforated sheets or wire mesh as shown in Fig. 10, or can be solid metal sheets. Material 39 contained in panels 44 is the same material as used in the cylinders of the inlet section. Top 40a covering section 22 is made of concrete slabs for easy removal, so a jet engine can be dropped down into the housing by crane.

Communicating with section 22 adjacent the exhaust of the jet engine being tested is the third section 23 of housing 20. The third section is of different design than the second section for reasons that will be set forth below. Figs. 6, 7 and 8 show in detail the construction of the panels or walls 50 of this section. These panels are each constructed of a double row 51 and 52 of upright cylinders 33 which are the same as those used in the inlet section. Row 51 is offset with respect to row 52 so the cylinders of row 51 are positioned with portions of their peripheries between portions of the peripheries of the cylinders of row 52 instead of in line with them to form a more compact and efficient sound absorbing wall 50. Supports 38 similar to those used in section 22 and the inlet section bind the two rows of cylinders into a compact unitary wall or panel which forms the sides of section 23. The third section 23 has a top 49 which is of the same construction as the tops of the other sections. The cylinders of the walls of the third section are filled with the same material 39 as the cylinders of the inlet section. Both the inner and outer sides of panels 50 used as walls for the third section are perforated, so it is possible for air or other gas to pass completely through these panels. The reason for this design adjacent the exhaust end of the jet engine being tested is that the jet blast from the jet engine will tend to create a venturi effect and low pressure area in this area, and air will tend to be drawn in through the walls of the third section due to the fact the pressure will be lower than atmospheric. This is beneficial in that this secondary air drawn into the housing will tend to cool the jet engine exhaust gases, so the gases will cause less deterioration of the housing and sound-absorbing material which forms a part thereof.

The next section of the housing is the fourth section 24 and it communicates directly with the third section. Again the construction of the walls of this section have been changed in design as compared to the walls of the other sections. However, the walls of the fourth section are most similar to the walls of section 22. Figs. 3, 4 and 5 show the details of the walls or panels 55 which are used in the fourth section. The inner or perforated side of these walls is a row 56 of upright perforated hollow cylinders 33 similar to those used in the inlet section and the third section. The outer side of panels 55 is a solid metal sheet 45 similar to that used as the outer side of the walls or panels of the second section. Structural supports 38 bind the parts of panel or wall 55 into a unitary structure in a similar manner to the other walls discussed. Sound-absorbing material 39 similar to that used in the other walls is contained in the cylinders of walls 55 and the space between the cylinders and the outer side of this wall. The ends of panel 55 can suitably be closed by a perforated metal sheet or screen 48 similar to that used to close the ends of the panels of section 22. Top 40 covers the fourth section of the housing in a similar manner to the other sections.

The terminating section of the housing is exhaust section 25. The outer walls or panels 55 of the exhaust section are identical in construction to the panels of the fourth section shown in detail in Figs. 3, 4 and 5. Three walls enclose all sides of the exhaust section except the open portion connecting the exhaust section with section four. Chimney 60 is positioned centrally within and as a part of the exhaust section to provide an outlet for the exhaust gases from the housing. Three sides of this chimney are enclosed by panels 61 made of two rows 62 and 63 of cylinders 33 spaced from each other to provide a space 64 therebetween. The cylinders and the space between the cylinders contains material 39, which is the same sound-absorbing material used throughout the housing. The fourth side or wall 65 of the chimney is open except for structural supports 38 forming the part of the chimney. This fourth side of the chimney serves as an inlet to the chimney for the exhaust gases from the housing. Triangular shaped structure 67 composed of cylinders 33 and suitable structural supports 38 is positioned on the upstream side of chimney 60 for the purpose of deflecting the exhaust gases around the chimney. The cylinders of this triangular structure contain the usual sound-absorbing material 39. Top 40 similar to that used on the other sections covers the exhaust section, except the opening in the top of the chimney providing for dispersing the exhaust gases from the housing.

Figs. 12 and 13 and Figs. 14 and 15 show two different designs of mufflers usable on internal combustion engines or on the exhaust of jet engines for test purposes.

Muffler 70 has a cylindrical metal casing 71 as the outer shell. Openings 72 and 73 are provided in the ends of the casing for introducing and dispersing the gas to be muffled. For convenience tubes 74 and 75 are connected to these openings to facilitate connecting the muffler to auxiliary equipment. Perforated hollow cylinder 76 communicating with openings 72 and 73 is positioned within casing 71 forming an annular space between the casing and the perforated cylinder and providing a channel through the casing for exhaust gases. Loose granular material 39 similar to that used for sound absorption in housing 20 is contained in this annular space. Cylindrical bands 77 lend structural support to cylinder 76. The parts of the muffler are joined by welding or other suitable means.

An alternative design of muffler is shown in Figs. 14 and 15 and is designated as muffler 80. This muffler 80 has casing 81 with openings 82 and 83 therein similar to muffler 70. Also tubes 84 and 85 communicate with the openings in the casing of muffler 80 for convenience of attaching the muffler to auxiliary equipment. Perforated hollow cylinders 33 similar to those used in housing 20 are supported in contact with the inner surface of the casing of muffler 80. Bands 87 hold the cylinders in place. The cylinders are filled with loose granular material 39 similar to that used in the housing for sound-absorption. The parts of the muffler can be joined by welding or other suitable means.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which may be made without departing from the spirit of the described invention or of the scope of the appended claims.

I claim:

1. A sound-absorbing housing for jet engine testing comprising an air inlet section, said inlet section comprising a vertically-positioned screen through which the greater portion of combustion air can enter the housing, a multiplicity of spaced rows of upright perforated hollow cylinders arranged perpendicular to the plane of said screen, two rows of which form the walls of said inlet section, loose granular material to absorb sound contained in said cylinders, structural means to support said cylinders and said screen in place as a part of the inlet section, and a top having perforated construction on the underside thereof and containing loose granular material to absorb sound forming the cover for said inlet section; a second section communicating with said inlet section and within which the jet engine being tested is placed comprising hollow panels as walls for said second section, a perforated structural sheet forming the inner side of each wall, a solid structural sheet forming the outer side of each wall, loose granular material to absorb sound contained in said walls, and a removable top covering said second section; a third section adjacent the exhaust end of the jet engine being tested and communicating with said second section comprising a double row of upright perforated hollow cylinders forming each wall of said third section, the cylinders of one row being positioned and supported with portions of their peripheries between portions of the peripheries of the cylinders of the other adjacent row to form a compact wall, loose granular material to absorb sound contained in said cylinders, and a top having perforated construction on the underside thereof and containing loose granular material to absorb sound covering said third section; a fourth section communicating with said third section comprising hollow panels as walls, a row of upright perforated hollow cylinders forming the inner side of each wall, a solid structural sheet forming the outer side of each wall, loose granular material to absorb sound contained in the cylinders and the space between the cylinders and the inner side of each wall, and a top having perforated construction on the underside thereof and containing loose granular material to absorb sound covering said fourth section; and an enlarged exhaust section communicating with said fourth section comprising an inclosing outer wall formed of hollow panels, a row of upright perforated hollow cylinders forming the inner side of the wall, solid structural sheets forming the outer side of the wall, loose granular material to absorb sound contained in the cylinders and the space between the cylinders and the outer side of the wall, a chimney positioned within the outer wall of the exhaust section as a part of the exhaust section, a double row of upright perforated hollow cylinders spaced to form an annular space therebetween inclosing three sides of said chimney, loose granular material to absorb sound contained in the chimney cylinders and the space therebetween, a triangular-shaped structure formed of a multiplicity of upright perforated hollow cylinders positioned on the upstream side of said chimney to deflect around the chimney the incoming exhaust gases to said exhaust section, loose granular material to absorb sound contained in the cylinders of the triangular structure, the fourth side of said chimney near the downstream end of said exhaust section being substantially open except for structure forming a part of the chimney, and a hollow top having perforated construction on the underside thereof and containing loose granular material to absorb sound covering all of said exhaust section except the opening in the top of said chimney.

2. The housing of claim 1 wherein said granular material is slag.

3. A sound-absorbing structure usable as a building material comprising a hollow panel having perforations therein, loose granular material to absorb sound contained in said panel, a row of upright perforated hollow cylinders forming one side of said panel, a solid structural sheet forming the other side of said panel, and the loose granular material to absorb sound being contained in said cylinders and the space between said cylinders and said solid structural sheet.

4. The structure of claim 3 wherein said granular material is slag.

5. A sound-absorbing structure usable as a building material comprising a hollow panel having perforations therein, loose granular material to absorb sound contained in said panel, each side of said panel being formed of a row of upright perforated hollow cylinders, the cylinders of one row being positioned with portions of their peripheries between portions of the peripheries of the cylinders of the other adjacent row, and the loose granular material to absorb sound contained in said cylinders.

6. The structure of claim 5 wherein said granular material is slag.

References Cited in the file of this patent

UNITED STATES PATENTS

| 1,912,544 | Slidell | June 6, 1933 |
| 2,146,028 | Reynolds | Feb. 7, 1939 |
| 2,334,502 | Parkinson et al. | Nov. 16, 1943 |
| 2,423,199 | Milnor | July 1, 1947 |
| 2,720,276 | Droeger | Oct. 11, 1955 |